United States Patent Office 2,851,392
Patented Sept. 9, 1958

2,851,392

ESTERS OF 6-METHYL-3-CYCLOHEXENE-1-CARBOXYLIC ACID AS ATTRACTANTS FOR THE MEDITERRANEAN FRUIT FLY

Samuel I. Gertler, Washington, D. C.

No Drawing. Application July 12, 1957
Serial No. 671,670

14 Claims. (Cl. 167—48)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

The patent rights for the United States in any invention in the patent to be granted on this application are dedicated to the public.

This invention relates to a method of using a novel group of synthetic organic compounds for the purpose of attracting Mediterranean fruit flies to detect and control local infestation.

Mediterranean fruit flies are of the species *Ceratitis capitata* which occurs in tropical and sub-tropical areas and constitutes a vary serious pest affecting citrus fruit and various vegetables. In some parts of the United States damage caused by these flies during the course of a season has been estimated to amount to millions of dollars.

In order to effect control of the Mediterranean fruit fly, it is necessary to locate the area and degree of infestation. This may be done by setting out traps in suspected areas and placing inside the traps a substance which acts as a bait or attractant for the flies. The bait may be applied to an inert carrier or it may be mixed with a toxic agent which kills all of the flies entering the trap. By counting the number of trapped flies it is possible to estimate the degree of infestation of a given area.

According to this invention certain esters of 6-methyl-3-cyclohexene-1-carboxylic acid have been found to attract the Mediterranean fruit fly either for purposes of estimating degree of infestation or for purposes of control.

These esters belong to the group represented by the general formula

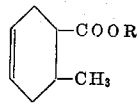

wherein R is an alkyl or cycloaliphatic radical. The alkyl groups may be further substituted with chlorine.

Esters, according to this invention, are prepared either by esterification of the acid with the required alcohol, using a suitable catalyst, such as, sulfuric acid or paratoluenesulfonic acid, or by means of the acid chloride as illustrated by the following examples:

Example 1

70.0 grams (0.5 mole) of 6-methyl-3-cyclohexene-1-carboxylic acid, 60 ml. of propyl alcohol, 200 ml. of benzene and 3 grams of p-toluene-sulfonic acid were refluxed using a water separator until no more water separated. The solution was washed with water, 10 percent sodium carbonate solution, and again with water. After drying, the benzene was distilled off and the residue fractionated in vacuo. The fraction distilling 106–7° C. at 14 mm. of pressure was propyl 6-methyl-3-cyclohexene-1-carboxylate. The yield was 82 grams of colorless liquid having a refractive index $(n_D^{25})$ of 1.4517.

Example 2

23.7 grams of cyclopentanol and 25 ml. of pyridine were dissolved in 150 ml. of benzene. The flask was immersed in cold water and while the mixture was stirred mechanically, 37.0 ml. of 6-methyl-3-cyclohexene-1-carbonyl chloride, dissolved in 50 ml. of benzene was slowly added. When addition was complete stirring was continued for 30 minutes longer. The solution containing white crystals of pyridine hydrochloride was washed with several portions of water, dried, and distilled in vacuo. The fraction distilling 141–3° C. at 13 mm. of mercury consisted of pure cyclopentyl 6-methyl-3-cyclohexene-1-carboxylate. The yield was 37.84 grams of liquid having a refractive index $(n_D^{25})$ of 1.4753.

In a similar manner the corresponding esters of methanol, ethanol, isopropanol, 2-chloroethanol, allyl alcohol, 2-propynyl alcohol, butanol, isobutanol, sec-butanol, pentanol, isopentanol, 1-ethylpropanol, 2-ethylbutanol, and cyclohexanol were prepared.

In order to determine the effectiveness of the esters they were tested in a cage olfactometer. This consists of a large chamber, from the ceiling of which a rotating rack is suspended. From the rack there are suspended a number of invaginated flasks, usually twelve. Some of these flasks contain water or other control materials, while other flasks contain a water emulsion of 0.01 to 0.1 percent of the ester to be tested. A number of flies are placed in the chamber and allowed to fly around freely. After a definite period of time the number of flies entering each of the flasks, acting as traps, is counted. The attractancy rating is obtained by dividing the number of flies attracted by the ester by the number attracted by the water or other control material.

Table I shows the results obtained with the above-mentioned esters:

TABLE I

*Attractancy rating of 6-methyl-3-cyclohexene-1-carboxylic acid esters in a 0.02 percent aqueous emulsion, to Mediterranean fruit flies of both sexes*

| Ester: | Attractancy rating |
|---|---|
| Methyl | 24 |
| Ethyl | 60 |
| Propyl | 43 |
| Isopropyl | 46 |
| 2-chloroethyl | 47 |
| Allyl | 51 |
| 2-propynyl | 34 |
| Butyl | 26 |
| Isobutyl | 55 |
| sec-Butyl | 46 |
| Pentyl | 34 |
| Isopentyl | 14 |
| 1-ethylpropyl | 16 |
| 2-ethylbutyl | 12 |
| Cyclopentyl | 35 |
| Cyclohexyl | 9 |

These esters can be used in actual practice in the field in traps either as an aqueous emulsion or impregnated in a small roll of absorbent material such as a dental roll. They can also be used in admixture with substances known to be toxic to the fruit fly such as parathion, malathion, DDVP (dimethyl-2, 2-dichlorovinyl phosphate), dieldrin, aldrin and the like. Thus the traps can be used as a method of control in isolated areas. In heavily infested areas supplementary control such as spraying toxicants from the air would be more effective.

I claim:

1. A method of detecting and controlling infestations of the Mediterranean fruit fly which comprises baiting a trap with an attractant comprising an ester of the general formula

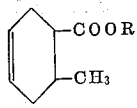

wherein R is selected from the group consisting of an alkyl group and a cycloaliphatic group.

2. The method of claim 1 wherein the ester is impregnated in an absorbent material.

3. The method of claim 1 wherein the ester is mixed with a toxicant for the Mediterranean fruit fly.

4. The method of claim 3 wherein the ester is isopropyl 6-methyl-3-cyclohexene-1-carboxylate.

5. The method of claim 3 wherein the ester is sec-butyl 6-methyl-3-cyclohexene-1-carboxylate.

6. The method of claim 3 wherein the ester is cyclopentyl 6-methyl-3-cyclohexene-1-carboxylate.

7. The method of claim 3 wherein the ester is ethyl 6-methyl-3-cyclohexene-1-carboxylate.

8. The method of claim 3 wherein the ester is isobutyl 6-methyl-3-cyclohexene-1-carboxylate.

9. A composition for controlling the Mediterranean fruit fly comprising a toxicant and an attractant having the general formula

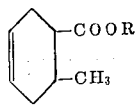

wherein R is selected from the group consisting of an alkyl group and a cycloaliphatic group.

10. The composition of claim 9 wherein the attractant is isopropyl 6-methyl-3-cyclohexene-1-carboxylate.

11. The composition of claim 9 wherein the attractant is sec-butyl 6-methyl-3-cyclohexene-1-carboxylate.

12. The composition of claim 9 wherein the attractant is cyclopentyl 6-methyl-3-cyclohexene-1-carboxylate.

13. The composition of claim 9 wherein the attractant is ethyl 6-methyl-3-cyclohexene-1-carboxylate.

14. The composition of claim 9 wherein the attractant is isobutyl 6-methyl-3-cyclohexene-1-carboxylate.

References Cited in the file of this patent

Chem. and Eng. News (I), p. 24, Feb. 11, 1957.
Chem. and Eng. News (2), pp. 80–81, April 15, 1957.
King: Chemicals Evaluated as Insecticides, U. S. D. A. Handbook No. 69, p. 140, May 1954.